US012138632B2

(12) United States Patent
Nater et al.

(10) Patent No.: US 12,138,632 B2
(45) Date of Patent: Nov. 12, 2024

(54) STIRRER MILL

(71) Applicant: BÜHLER AG, Uzwil (CH)

(72) Inventors: Eduard Nater, Uzwil (CH); Achim Sturm, Uzwil (CH); Andreas Rieche, Uzwil (CH)

(73) Assignee: BÜHLER AG, Uzwil (CH)

( * ) Notice: Subject to any disclaimer, the term of this patent is extended or adjusted under 35 U.S.C. 154(b) by 297 days.

(21) Appl. No.: 17/754,235

(22) PCT Filed: Sep. 30, 2020

(86) PCT No.: PCT/EP2020/077315
§ 371 (c)(1),
(2) Date: Mar. 28, 2022

(87) PCT Pub. No.: WO2021/063995
PCT Pub. Date: Apr. 28, 2021

(65) Prior Publication Data
US 2022/0371022 A1 Nov. 24, 2022

(30) Foreign Application Priority Data
Oct. 1, 2019 (EP) .................................... 19200882

(51) Int. Cl.
*B02C 17/16* (2006.01)
*B02C 17/18* (2006.01)

(52) U.S. Cl.
CPC ........ *B02C 17/161* (2013.01); *B02C 17/1855* (2013.01)

(58) Field of Classification Search
CPC ..... B02C 17/161; B02C 17/16; B02C 17/183; B02C 17/1855
See application file for complete search history.

(56) References Cited

U.S. PATENT DOCUMENTS 3,802,633 A * 4/1974 Schold .................. B02C 17/161 241/72
4,044,957 A * 8/1977 Schold .................. B02C 17/161 241/46.11
(Continued)

FOREIGN PATENT DOCUMENTS

CN 1215632 A 5/1999
CN 1583276 A 2/2005
(Continued)

*Primary Examiner* — Faye Francis
(74) *Attorney, Agent, or Firm* — Colson Law Group, PLLC

(57) ABSTRACT

A stirrer mill for processing flowable material to be ground including a mill container, a milling chamber that is delimited by a container wall, a stirrer that can rotate about the center longitudinal axis and has a rotor, and an inner stator arranged within the rotor. A ground material discharge channel is formed between the rotor and an outer wall of the inner stator, via which the ground material is guided to the separation unit and then to an outlet line. The milling chamber is at least partially filled with milling elements. A separation unit is arranged above the inner stator. A ground material discharge chamber is formed after the milling element separation unit, in the flow direction of the ground material. A unit for reducing the volume is attached in the ground material discharge chamber.

10 Claims, 3 Drawing Sheets

(56) References Cited

U.S. PATENT DOCUMENTS

Figure 1:
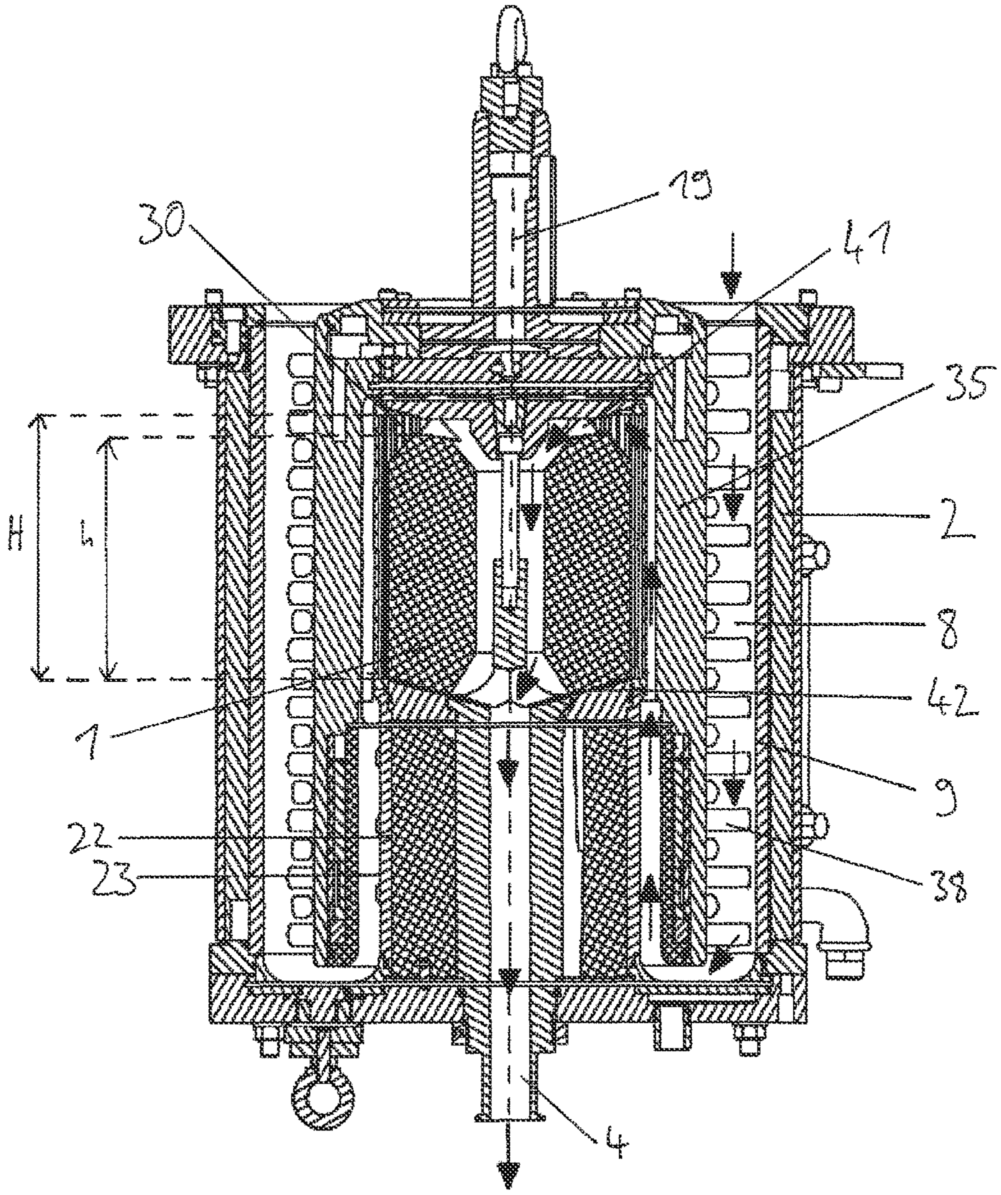

| | | | | | |
|---|---|---|---|---|---|
| 5,133,508 | A | * | 7/1992 | Stehr | B02C 17/16 241/171 |
| 5,785,262 | A | * | 7/1998 | Tippett | B02C 17/161 241/74 |
| 5,894,998 | A | * | 4/1999 | Schall | B02C 17/161 241/179 |
| 2010/0270408 | A1 | | 10/2010 | Ishikawa | |

FOREIGN PATENT DOCUMENTS

| | | | | | |
|---|---|---|---|---|---|
| CN | 104053506 | A | | 9/2014 | |
| CN | 107999210 | A | | 5/2018 | |
| CN | 110270415 | A | | 9/2019 | |
| DE | 3838981 | A | * | 5/1990 | B02C 17/16 |
| DE | 4010926 | A1 | | 10/1991 | |
| DE | 19638354 | A1 | | 3/1998 | |
| DE | 19819967 | A1 | | 11/1999 | |
| EP | 1155735 | A1 | * | 11/2001 | B01F 27/171 |
| EP | 1992412 | A1 | | 11/2008 | |
| JP | 2010188348 | A | * | 9/2010 | B02C 17/16 |
| JP | 198823753 | A | | 8/2023 | |
| KR | 911760 | B1 | * | 8/2009 | B02C 17/161 |
| WO | WO-2007042059 | A1 | * | 4/2007 | B02C 17/16 |

* cited by examiner

STIRRER MILL

CROSS-REFERENCE TO RELATED APPLICATIONS

The instant application is a national stage application, pursuant to 35 USC 371, of International Patent App. No. PCT/EP2020/077315, filed Sep. 30, 2020, which application claims the benefit, under Articles 4 and 8 of the Stockholm Act of the Paris Convention for the Protection of Industrial Property, and priority to, European Pat. App. No. 19200882.9, filed Oct. 1, 2019, each of the above-identified applications are incorporated herein by reference in their entireties.

The invention relates to a stirrer mill according to the preamble of claim 1.

The invention refers to the European patent specification EP 1 992 412 A1. Such a stirrer mill is known therefrom. Stirrer mills are used to disperse suspensions, i.e., solids in liquids. This is used, for example, in the production of adhesives, printing inks, cosmetics, or pharmaceuticals. For this purpose, the material to be ground is guided via a supply channel into a milling chamber of the stirrer mill, which channel is formed between the outer wall of a rotor and a container wall, and is comminuted together with auxiliary milling elements, for example ceramic balls which are also referred to below as milling elements, and with the aid of tools which are arranged on the rotor and, where applicable, additionally on the container wall. Via the stirring movement, agglomerates are dispersed and crystal structures are comminuted. The original particle size of 100-500 μm can thereby be reduced to less than 3 μm. The finished product is then guided via a ground material discharge channel through a milling element separation unit, especially in the form of a protective screen, into a ground material discharge chamber arranged after the separation unit, and then to an outlet line. The rotor thereby forms a kind of rotating cage around the separation unit.

In such vertical stirrer mills, there is the problem that air remains in the region of the separation unit after start-up. In operation, it is further desirable to keep the dwell time distribution narrow and to enable a slug flow in the device. Furthermore, in conventional stirrer mills, deposits of the preceding product can occur, which can negatively influence the quality of the following product. This entails a complicated cleaning after each product change. Cleaning devices that are used in conventional stirrer mills have a displacement body which, due to the required mobility, must be relatively small in its dimensions.

Via the invention, an improved stirrer mill should be provided which solves these problems. Furthermore, via the invention the possibility should be provided to be able to realize the improvements also for existing stirrer mills, via a simple retrofitting.

The core of the invention is to reduce the clearance volume after or within the separation unit. Furthermore, it can be achieved that a flow rate of the product is increased. The clearance volume after or within the separation unit can be reduced by using a unit for reducing the volume of the ground material discharge chamber, and especially by inserting a cylindrical body, what is known as a filling body with a central opening, especially generally in the form of a hollow cylinder. Furthermore, the filling body can be executed such that it ensures a minimum level of the product. Via a unit for setting a minimum level, it can be further ensured that a product discharge is possible only above a certain minimum level. The two units can also be used jointly. Via the present invention, the clearance volume after the separation unit or the protective sieve of the stirrer mill can thus be reduced, and/or the position of the product discharge can be displaced upward. By reducing the volume of the ground material discharge chamber, the flow rate is further increased, and it is therewith achieved that contamination of the channel walls can be reduced or largely avoided by the material itself flowing through.

A stirrer mill can thus have a mill container, and a milling chamber which is delimited by a container wall and is at least partially filled with milling elements, and a stirrer with rotor that can rotate during operation about a center longitudinal axis which is arranged substantially vertically. An inner stator is arranged inside the rotor. A ground material discharge channel is formed between the rotor and an outer wall of the inner stator, via which the ground material is guided through a milling element separation unit in the direction of a discharge pipe. The milling element separation unit is preferably executed in the form of a substantially vertically arranged cylinder, especially a cylinder screen, having a height H. A ground material discharge chamber is formed after the milling element separation unit, in the flow direction of the ground material. A unit for setting a minimum level of the product within the ground material discharge chamber is arranged in the ground material discharge chamber. The interior of the separation unit preferably forms the ground material discharge chamber, and the minimum level in the ground material discharge chamber is preferably greater than or equal to 0.85 H.

The invention comprises a stirrer mill for processing flowable material to be ground, said mill having a mill container and a milling chamber that is delimited by a container wall of the mill container and is at least partially filled with milling elements. Furthermore, the stirrer mill has a stirrer with rotor that can rotate during operation about a center longitudinal axis arranged substantially vertically. An inner stator is arranged inside the rotor. A ground material discharge channel is formed between the rotor and an outer wall of the inner stator, via which the ground material is guided through a milling element separation unit in the direction of a discharge pipe. A ground material discharge chamber is formed after the milling element separation unit, in the flow direction of the ground material. A unit for reducing the volume of the ground material discharge chamber is arranged in the ground material discharge chamber.

The milling element separation unit is preferably executed in the form of a substantially vertically arranged cylinder having a height H, the interior of which forms the ground material discharge chamber. The unit for reducing the volume of the ground material discharge chamber can be formed by a filling body. The filling body preferably terminates in a product-tight manner with a discharge floor of the stirrer mill, and has an overflow height h of the product in the vertical direction, wherein the height H of the milling element separation unit is greater than the overflow height h. h is preferably greater than or equal to 0.85 H, especially preferably greater than or equal to 0.95 H.

The filling body is preferably a substantially cylindrical hollow body. The unit for reducing the volume of the ground material discharge chamber can be made of plastic or metal or ceramic material. The unit for reducing the volume of the ground material discharge chamber can be executed so as to be temperature-controlled.

The separation unit is preferably a cylindrical screen. The unit for reducing the volume of the ground material discharge chamber can also be removable.

The unit for reducing the volume of the ground material discharge chamber preferably reduces the volume of the ground material discharge chamber by at least 70%.

Tools which project into the milling chamber are preferably attached to the rotor, and in some instances to the container wall.

The unit for setting a minimum level as described above can also be used in the stirrer mill with the unit for reducing the volume. Both units can be used separately from one another or jointly in order to achieve the object of the present invention.

Furthermore, the invention comprises a method for operating and cleaning a stirrer mill with the insertion of a unit for reducing the volume of the ground material discharge chamber of the stirrer mill as described above. During operation of the stirrer mill, the flow rate of the material to be ground through the ground material discharge chamber is thereby great enough to reduce product deposits, especially in the ground material discharge chamber of the stirrer mill.

Via the units according to the invention for setting a minimum level in the ground material discharge chamber and/or for reducing the volume of the ground material discharge chamber, which units can especially be installed in an existing stirrer mill, the clearance volume after the separation unit can be reduced. The mill can thereby be filled almost completely before the ground material can flow off. By increasing the discharge rate, an entrainment of the ground material is avoided, and product loss and cleaning effort can thereby be reduced. This is used by the cleaning method according to the invention.

Further features, advantages, and details emerge from the following description of the invention with reference to the drawings. The following is shown FIG. 1 a detail of a stirrer mill according to one embodiment of the invention, as a vertical longitudinal section, FIG. 2 a schematic sectional view of a filling body according to one embodiment of the invention, and FIG. 3 a perspective view of a filling body according to one embodiment of the invention.

FIG. 1 shows a longitudinal section through a stirrer mill according to the invention. The stirrer mill has a mill container 2 with an internal milling chamber 8 in a conventional manner. The milling chamber 8 is at least partially filled with milling elements (not shown). The stirrer mill furthermore comprises an inner stator 22 and a rotor 35 that can rotate about a center longitudinal axis 19. A ground material discharge channel is thereby formed between an outer wall 23 of the inner stator 22 and an inner wall of the rotor 35, and is likewise part of the milling chamber 8. Tools 38 which project into the space between rotor 35 and a container wall 9 of the mill container 2 can be attached to the rotor 35. The tools 38 can alternatively or additionally be arranged on the container wall 9. The material to be ground is generally introduced from above into the stirrer mill and ground in the milling chamber 8 by means of the milling elements. At the lower end of the milling chamber 8, the ground material is guided to the inner side of the rotor 35, thus into the part of the milling chamber 8 between the inner stator 22 and the inside of the rotor 35. There it flows upward, where milling elements that may have been carried along are deposited to the outside into the milling chamber 8. Located above the inner stator 22 is a separation unit 30, for example a cylindrical protective screen, which is rotationally symmetrical with respect to the center longitudinal axis 19. The separation unit 30 prevents the flow of milling elements into a downstream outlet line 4, which is located within the inner stator 22. The fully ground material flows inward through the separation unit 30 into the outlet line 4. Arrows in FIG. 1 illustrate the flow direction of the ground material through the stirrer mill. The stirrer mill has an outflow floor 42 below the milling element separation unit 30. This is arranged on the inside in relation to the milling element separation unit 30. The outlet line 4 is preferably arranged in the center of the outflow floor 42. Furthermore, the outflow floor 42 can be designed to taper conically in the direction of the outlet line 4. In other words, during operation a radially outer side of the outflow floor 42 can be arranged higher in a vertical direction than the outlet line 4, in order to simplify the product flow into the center and thus in the direction of the outlet line 4.

Attached within the separation unit 30 is a unit for reducing the volume of the ground material discharge chamber, especially a filling body 1, which reduces the volume of the ground material discharge chamber after the separation unit 30. Furthermore, air inclusions in the product are thereby reduced, whereby the efficiency of the machine may thereby be increased. The separation unit 30 is thereby preferably not closed, so that a product flow through the entire surface of the separation unit 30 is ensured. This can be seen in the Figure, via a reduction of the interface in the region of the ground material discharge chamber after the separation unit 30. In the following, the unit for reducing the volume of the ground material discharge chamber is referred to as a filling body 1. The filling body 1 is preferably executed to be product-tight with the discharge floor 4, so that the end product can only flow off above the filling body 1. The filling body 1 can thereby be, for example, a cylinder having a central opening or a cylindrical hollow body. The filling body 1 can also be executed as a substantially cylindrical rotationally symmetrical body. For example, the upper and/or lower side of the filling body 1 can thereby be completely or partially beveled. In the event of a hollow cylindrical shape, the upper or the upper and/or lower sides can thereby respectively have a different inclination and/or inclination direction in the direction of the center longitudinal axis 19 than in the direction of the outer side. Depending on the embodiment of the separation unit 30, different shapes of the filling body 1 can thus be expedient. In the event of a product-tight design with the discharge floor 42, a minimum level of the product in the ground material discharge chamber in a vertical stirrer mill is thus also ensured during operation. For this purpose, the filling body 1 has discharge channels 41 by which the overflow height h is defined. However, the filling body 1 can also be executed smooth, i.e., without channels, on the upper side. The height h of the separation unit 30 is thereby greater than the overflow height h of the filling body.

A minimum level of the product, of at least 85% of the height of the milling element separation unit, is especially to be ensured by the filling body; i.e., $h \geq 0.85$ H applies for the overflow height h of the filling body. Preferably, h is approximately 0.95 H. In addition, the volume of the ground material discharge chamber is reduced by the shown filling body 1 by, for example, at least approximately 70%, and the height of a channel 41, which is formed directly after the separation unit 30 by the inserted filling body 1, is reduced to, for example, approximately 10 mm, which leads to a flow rate of up to 2 m/s, at which rate an excellent cleaning of the ground material discharge channel 4 can be achieved.

The filling body 1 can be executed to be removable. However, the filling body 1 can also be executed or manufactured integrally with the outflow floor 42 or the cover of the ground material discharge chamber.

In another preferred embodiment, the filling body 1 is designed in such a way that it does not terminate in a product-tight manner with the discharge floor 42. Thus, only a reduction in the volume within the separation unit 30, i.e., the ground material discharge chamber, is ensured, but not the aforementioned minimum level of the product. For example, spacers can ensure a defined distance from the discharge floor 42, between which the product can discharge.

The filling body 1 can also be executed so as to be temperature-controlled. It can thus be ensured that, by inserting the filling body 1, the desired temperature of the product cannot be changed or can be maintained during the dispersing process. Furthermore, the filling body 1 can be connected to an existing temperature system of the stirrer mill, which system is used especially for cooling the components of the stirrer mill. The separation unit 30 is normally executed statically, i.e., the filling body 1 likewise does not perform a rotational movement. Therefore, the connection to the temperature system of the stirrer mill is easy to accomplish. In the event that the filling body 1 is executed integrally with the machine, the temperature control during the production process can already be provided.

According to a further preferred embodiment, a unit for setting a minimum level can also be provided, which unit sets a minimum level of the product in the ground material discharge chamber in a vertical stirrer mill during operation. In other words, a minimum level or a minimum product level in the ground material discharge chamber is ensured or guaranteed. The clearance volume in the ground material discharge chamber is thereby reduced. This reduces the air inclusions in the product and provides for a faster and more efficient processing and flow of the product. This unit for setting a minimum level can be provided separately from or in addition to the filling body 1. For example, the outlet line 4 can be lengthened such that it extends up to a certain height in the ground material discharge chamber, i.e., inside the separation unit 30. This height is preferably at least 0.85 H. In other words, the product level within the ground material discharge chamber is at least 0.85 H. The height of the unit for setting a minimum level of the product is especially preferably 0.95 H. The unit for setting a minimum level can be removable or be integrally executed with the outlet line 4. The unit terminates product-tight with the discharge floor 42. The unit for setting a minimum level can also be executed so as to be regulatable or controllable.

Figure 2:
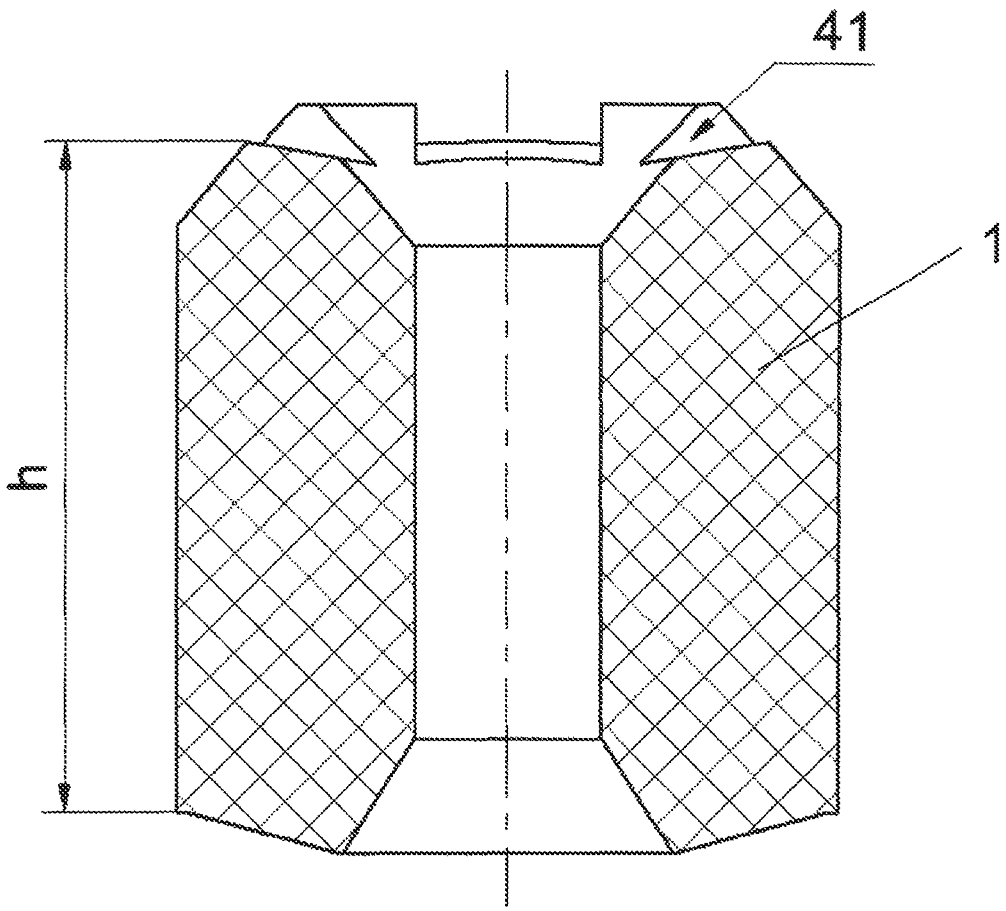

The filling body according to the embodiment shown in FIG. 1 is shown separately in a sectional view in FIG. 2. The filling body 1 is executed to be rotationally symmetrical, and is adapted to the ground material discharge chamber after the separation unit 30 of an existing stirrer mill. Due to the special embodiment of the filling body, the channel 41 shown in FIG. 1, which defines the overflow height h, is formed with a reduced cross section, especially in the upper region after the separation unit, whereby the flow rate is increased accordingly.

Figure 3:
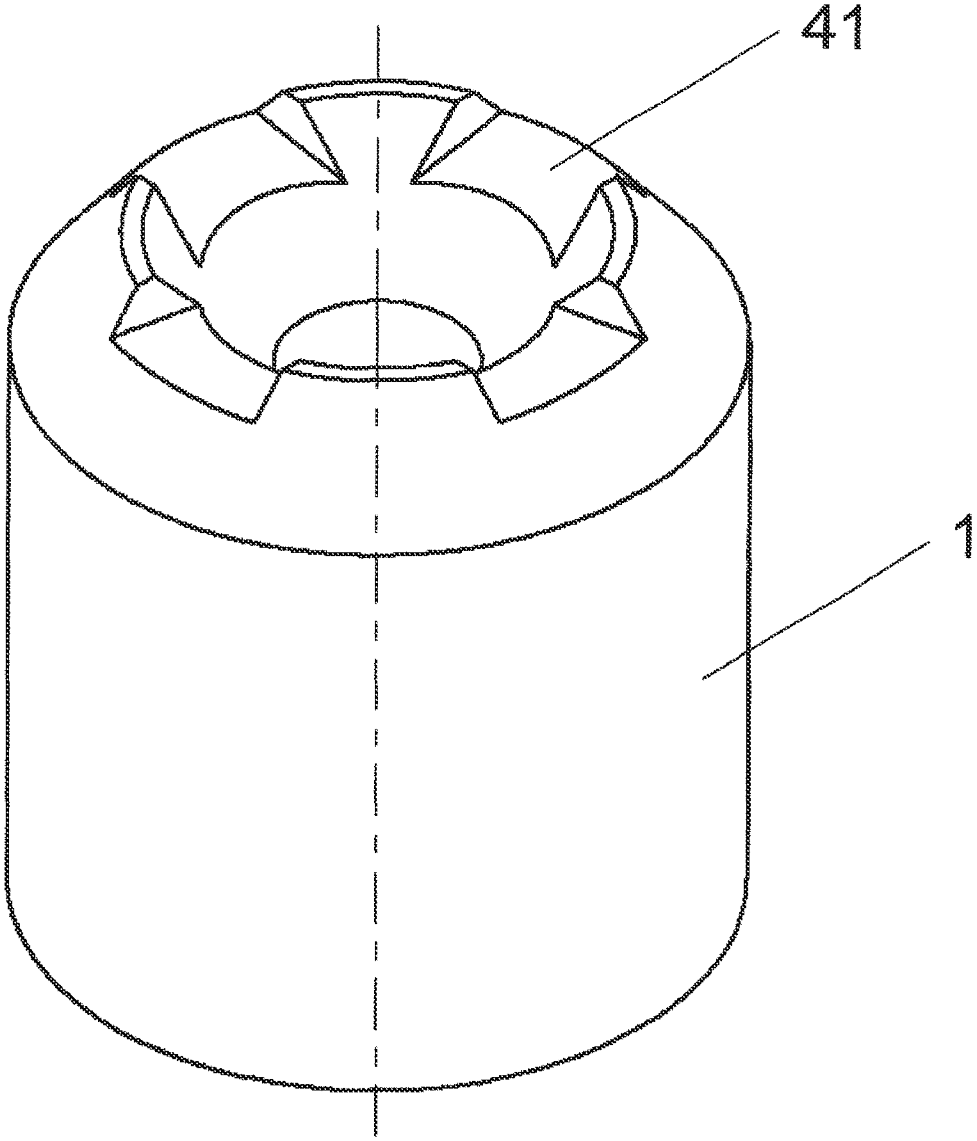

FIG. 3 shows a perspective view of the filling body 1 according to a preferred embodiment. A preferred arrangement of the channels 41 is hereby also apparent. Other arrangements or dimensions may also be expedient.

When the stirrer mill is started up, it is desired to displace air with product in the outlet region as quickly as possible in order to avoid the formation of air pockets in the mill. Up to this point, the product flows out of the stirrer mill at the lowest point of the separation unit, wherein the air remains above in the stirrer mill. Via the filling body according to the invention and/or the unit for setting a minimum level, the liquid or product discharge can be displaced upward or to the highest point of the separation unit. The clearance volume after or within the separation unit is thus reduced, since the product outflow is possible only above the filling body or the unit for setting or ensuring a minimum level. The mill can thereby be completely filled before the ground material discharges through the separation unit.

After the product to be dispersed has passed the separation unit, it should leave the stirrer mill as quickly as possible. The dwell time distribution is therefore to be kept narrow, and a plug flow is preferred.

In conventional stirrer mills, product deposits can occur precisely in the region of product discharge, i.e., especially in the ground material discharge chamber and outlet line. Thus, the stirrer mill must be cleaned in a complicated manner by the user before each product change, since the product deposits of the preceding product can otherwise be present in the current production. Such product removals can negatively influence the quality of the derivative product. By increasing the flow rate and avoiding air inclusions in the product by reducing the volume of the ground material discharge chamber and/or increasing the product level within the ground material discharge chamber according to the present invention, such deposits and the resulting product loss can be reduced or even avoided.

As described above, the object of the present invention can be achieved by setting a minimum level of the product in the ground material discharge chamber, and/or by reducing the volume in the ground material discharge chamber. The embodiments may especially be used individually as alternative achievements, or in combination, to realize the object of the invention.

The invention further comprises a method for operating and cleaning a stirrer mill by means of the above-described unit for reducing the volume of the ground material discharge chamber. The advantages set forth in the present description are hereby achieved. Accordingly, by using the unit according to the invention for reducing the volume of the ground material discharge chamber in accordance with the method according to the invention, it can be achieved that, during operation of the stirrer mill, the flow rate of the ground material through the ground material discharge chamber is great enough to reduce product deposits, especially in the ground material discharge chamber of the stirrer mill.

Via the insertion according to the invention of a filling body or cylindrical hollow body and/or a unit for setting a minimum level, the cleaning cost of the stirrer mill and also the use of cleaning agents can thus be reduced. Furthermore, there is less product loss in production, and a narrower and thus more favorable dwell time distribution. Air present in the stirrer mill can be displaced upon starting.

The filling body according to the invention can be used in existing vertical stirrer mills. No elaborate and expensive retooling is necessary to do this, and a simple retrofit installation or retooling can be performed.

Depending on the separation unit, other shapes than a cylindrical shape can also be expedient.

This achievement can be used especially for all vertical stirrer mills having a sieve-like separation unit.

LIST OF REFERENCE SIGNS

1 Filling body
2 Mill container
4 Discharge pipe
8 Milling chamber

9 Container wall
19 Center longitudinal axis
22 Inner stator
23 Outer wall
30 Milling element separation unit
35 Rotor
38 Tools
41 Channel
42 Outflow floor
h Overflow height
H Height of the milling element separation unit

The invention claimed is:

1. A stirrer mill for processing flowable material to be ground, comprising:

a mill container and a milling chamber that is delimited by a container wall of the mill container and is at least partially filled with milling elements, and a stirrer with a rotor that can rotate during operation about a center and vertically oriented longitudinal axis, and an inner stator which is arranged within the rotor, and wherein a ground material discharge channel is formed between the rotor and an outer wall of the inner stator, via which the ground material is guided through a milling element separation unit in the direction of a discharge pipe, wherein a ground material discharge chamber is formed after the milling element separation unit in the flow direction of the ground material, wherein a unit for reducing the volume of the ground material discharge chamber is arranged in the ground material discharge chamber, wherein the unit for reducing the volume terminates product-tight with a discharge floor of the stirrer mill and has an overflow height h of the product in the vertical direction, wherein a height H of the milling element separation unit is greater than the overflow height h, wherein h is greater than or equal to 0.85 H.

2. The stirrer mill according to claim 1, wherein the milling element separation unit comprises a vertically oriented cylinder having the height H, the interior of which forms the ground material discharge chamber, and the unit for reducing the volume of the ground material discharge chamber comprises a filling body.

3. The stirrer mill according to claim 1, wherein the unit for reducing the volume of the ground material discharge chamber comprises a cylindrical hollow body.

4. The stirrer mill according to claim 1, wherein the unit for reducing the volume of the ground material discharge chamber comprises one or more of plastic or metal or ceramic material.

5. The stirrer mill according to claim 1, further comprising a temperature control system.

6. The stirrer mill according to claim 1, wherein the separation unit comprises a cylindrical screen.

7. The stirrer mill according to claim 1, wherein the unit for reducing the volume of the ground material discharge chamber is removable.

8. The stirrer mill according to claim 1, wherein the unit for reducing the volume of the ground material discharge chamber reduces the volume of the ground material discharge chamber by at least 70%.

9. The stirrer mill according to claim 1, wherein tools that protrude into the milling chamber are attached to one or more of the rotor and the container wall.

10. A method for operating and cleaning a stirrer mill, comprising inserting the unit for reducing the volume of the ground material discharge chamber of the stirrer mill according to claim 1, wherein the flow rate is increased and air inclusions are avoided via the insertion of the unit for reducing the volume.

* * * * *